(12) United States Patent
Gersting

(10) Patent No.: US 7,039,594 B1
(45) Date of Patent: May 2, 2006

(54) METHOD AND SYSTEM FOR CONTENT MANAGEMENT ASSESSMENT, PLANNING AND DELIVERY

(75) Inventor: Adam M. Gersting, Merrillville, IN (US)

(73) Assignee: Accenture, LLP, Palo Alto, CA (US)

( * ) Notice: Subject to any disclaimer, the term of this patent is extended or adjusted under 35 U.S.C. 154(b) by 220 days.

(21) Appl. No.: 09/626,100

(22) Filed: Jul. 26, 2000

(51) Int. Cl.
*G06F 17/60* (2006.01)

(52) U.S. Cl. .............................. 705/7; 705/10; 705/14; 717/100; 717/101; 707/10

(58) Field of Classification Search .................... 705/7, 705/10, 14; 717/101, 100; 707/10
See application file for complete search history.

(56) References Cited

U.S. PATENT DOCUMENTS

| | | | |
|---|---|---|---|
| 5,553,226 A | | 9/1996 | Kiuchi et al. |
| 5,557,790 A | | 9/1996 | Bingham et al. |
| 5,758,257 A | * | 5/1998 | Herz et al. ............... 725/116 |
| 5,794,210 A | * | 8/1998 | Goldhaber et al. ........... 705/14 |
| 5,794,221 A | | 8/1998 | Egendorf |
| 5,911,776 A | | 6/1999 | Guck |
| 5,940,504 A | | 8/1999 | Griswold |
| 6,029,195 A | * | 2/2000 | Herz ........................... 725/116 |
| 6,041,316 A | | 3/2000 | Allen |
| 6,084,865 A | | 7/2000 | Dent |
| 6,105,042 A | * | 8/2000 | Aganovic et al. ........... 345/660 |
| 6,105,062 A | | 8/2000 | Andrews et al. |
| 6,112,181 A | | 8/2000 | Shear et al. |
| 6,135,646 A | | 10/2000 | Kahn et al. |
| 6,161,107 A | | 12/2000 | Stern |
| 6,189,008 B1 | | 2/2001 | Easty et al. |
| 6,202,056 B1 | | 3/2001 | Nuttall |
| 6,219,788 B1 | | 4/2001 | Flavin et al. |
| 6,236,994 B1 | * | 5/2001 | Swartz et al. ............... 707/101 |
| 6,356,903 B1 | * | 3/2002 | Baxter et al. .................. 707/10 |
| 6,437,818 B1 | * | 8/2002 | Ludwig et al. .......... 348/14.09 |
| 6,574,609 B1 | * | 6/2003 | Downs et al. ................ 705/50 |
| 2001/0049632 A1 | | 12/2001 | Rigole |
| 2002/0059604 A1 | * | 5/2002 | Papagan et al. .............. 725/51 |

FOREIGN PATENT DOCUMENTS

| | | |
|---|---|---|
| EP | 0 864 990 A2 | 9/1998 |
| GB | 2 187 580 A | 9/1987 |
| GB | 2 260 007 A | 3/1993 |
| GB | 2 302 420 A | 1/1997 |
| GB | 2 361 331 A | 10/2001 |
| WO | WO 99/31610 | 6/1999 |
| WO | 00/72574 A3 | 11/2000 |

(Continued)

OTHER PUBLICATIONS

"V/5 business Platform Architecture", VIGNETTE, www.vignette.com/CDA/Site, Jun. 21, 2000, 9 pgs.

(Continued)

*Primary Examiner*—Tariq R. Hafiz
*Assistant Examiner*—Andre Boyce
(74) *Attorney, Agent, or Firm*—Banner & Witcoff, Ltd.

(57) ABSTRACT

A method is disclosed for designing a coordinated content management and delivery system, using key considerations related to the client environment, and using key processes, and applying these to the design problem with the assistance of a template showing basic content management and delivery element relationships, whereby such a system can be implemented wherein coherent sales, training or marketing campaigns may be efficiently generated to web-based and other clients.

17 Claims, 8 Drawing Sheets

FOREIGN PATENT DOCUMENTS

| WO | WO 01/28141 A1 | 4/2001 |
| WO | WO 01/48634 A2 | 7/2001 |
| WO | WO 01/69903 A1 | 9/2001 |

OTHER PUBLICATIONS

"4I Content management", Documentum, product description, www.documetnum.com/products/content/index.html, Jun. 21, 2000, 16 pgs.

Black Pearl Knowledge Broker, www.blackpearl.com/solutions/solutions_body.html, Jun. 21, 2000, 13 pgs.

"Building profitable, interactive relationships between customers and companies", xchange software, www.xchange.com/news/press_releases/1999, 13 pgs.

thomastech solutions, description of services, www.thomastechsolutions.com, Oct. 13, 2000, 3 pgs.

Open Market e-Business Suite, product overview, www.openmarket.com/cgi, Oct. 13, 2000, 2 pgs.

Verity, Knowledge Organizer, product overview, www.verity.com/products/ko, Oct. 13, 2000, 2 pgs.

Focused Internet Solutions, product overview, www.solutionfocus.com, Oct. 13, 2000, 3 pgs.

Web Content Management: Strategies, Technologies and Markets, 2000, Ovum Ltd., 230 pgs.

T. Berg et al., "Web-Site Deployment and Operations", Jan. 1999, Gartner Group, 77 pgs.

M. Fleming, "Content managers Should Reassess Web Sites Validity", Jan. 1999, Gartner Group, 3 pgs.

C. Foster, "Content Management Defining Requirements for Competitive Advantage", Mar. 1999, Jupiter Communications, 68 pgs.

R. Kirzner, "Managing Content: The Key to Success in Web Business", Bulletin, Intern. Data Corp. doc. No. 20066, Jun. 1999, 12 pgs.

R. Knox, "Publishing at Light Speed: The Document in Transition", Sep. 1998, Gartner Group, 38 pgs.

R. Knox, "Multichannel Output: Process Changes on Horizon", Apr., 1999, Gartner Group, 4 pgs.

J. Ingalls et al., "Where is Output Headed? Ten Key Trends", Jan. 1999, Gartner Group, 5 pgs.

S. Robins, "Web content Management- for Pervasive Content", Presentation, The Yankee Group, 26 pgs.

S. White, "Managing Development and Delivery of Content", Bulletin, Intern. Data Corp. doc. No. 19167, May 1999, 15 pgs.

Ch. Seeley et al., "Cragting a Knowledge Management's Strategy", Knowledge Management Review, Jan./Feb. 2000, issue 12, pp. 20-23.

M. LaMonica, "Content Management made Strategic", INFOWORLD, Feb. 19, 2001, vol. 23, issue 8, p. 48.

S. Sanborn, "Content Management Expands its Role", INFOWORLD, Feb. 19, 2001, vol. 23, issue 8, p. 38.

F. Dufaux, "Key frame selection to represent a video", IEEE vol. 2 of 3, conf. 7, Sep. 10, 2000, pp. 275-278.

J. Saarela et al., "Logical Structure of a hypermedia newspaper", Info. Proceedings & Management, vol. 33, No. 5, Sep. 1, 1997, pp. 599-612.

Y. Shibata et al., "Dynamic Hypertext and Knowledge Agent Systems for Multimedia Information Networks", Proc. of the ACM Conference on Hypertext, Nov. 14, 1993, pp. 82-93.

European Search Report mailed on Apr. 14, 2004, for EP 03253075, 5 pgs.

* cited by examiner

Typical Internet Network Configuration

200 Typical General Purpose Computer/

Exemplary Data Structure for Profile

| Field | Type |
|---|---|
| ID | INT |
| IP_ADDRESS | VARCHAR |
| USER_NAME | VARCHAR |
| FIRST_ACCESS | TIME/DATE |
| LAST_ACCESS | TIME/DATE |
| TOTAL_ACCESSES | INT |
| TOTAL_CLICKS | |
| TOPIC_A_CLICKS | INT |
| TOPIC_B_CLICKS | INT |
| TOPIC_C_CLICKS | INT |
| TOPIC_D_CLICKS | INT |
| . . . | |

FIGURE 7

METHOD AND SYSTEM FOR CONTENT MANAGEMENT ASSESSMENT, PLANNING AND DELIVERY

RELATED APPLICATIONS

This application is related to copending U.S. patent application Ser. No. 09/321,951 filed May 27, 1999 titled "A System, Method, and Article of Manufacturing For Providing Content Management-Related Web Application Services" which is fully incorporated herein by reference, and to U.S. patent application Ser. No. 10/071,357 filed Feb. 7, 2002 titled "Improvements in and Relating to Multi-Media Management Systems", and to U.S. patent application Ser. No. 10/269,683 filed Oct. 11, 2002 titled "Corporate Content Management and Delivery."

TECHNICAL FIELD

This invention relates to the field of electronic computer related systems. More particularly, the present invention relates to a method and system for content management assessment, planning and delivery (CDM) wherein the content comprises knowledge and multimedia data and related parameters for use in sales campaign development, improving operational efficiency, and publishing, driving and supporting revenue generating electronic transactions.

BACKGROUND ART

A technical problem presently exists in the development and efficient use of content and knowledge data which is effective in the development of sales and marketing campaigns, improving operational efficiency and publishing, and effective in supporting revenue generating electronic transactions. Content management involves the storage and processing of any type of data fragment. A data fragment might include a bit of text, a document, presentation, image, audio file, video file, etc. In essence, any discrete electronic file can be stored and managed as a piece of meaningful content. Types of content that must be managed include documents and digital files—as well as formalized knowledge. The processes for managing these items are generally common to document management, digital asset management, and knowledge management. These terms-document management and digital asset management—and relationships to content management are described in more detail below.

Over the last several months, there has been a significant increase in demand for content management solutions. This demand is driven by several factors in the marketplace:

Content management is being recognized as critical to efficiently and effectively supporting and operating publication process and supporting commerce in the current economy. Content management is also being recognized as playing a key role in electronic and on-line learning.

The amount of content in enterprises is increasing dramatically, as is the demand for more efficient management of content. (Gartner Group States that: By 2002, escalating costs of managing Web content and components will drive more than 80 percent of Global 2,000 enterprise sites to purchase packages or build applications to automate these functions (0.8 probability).

The demand for point and place of time delivery of content in a consistent and personalized fashion across multiple channels is increasing. (Gartner Group states that: By 2004, leading-edge enterprises will have formal content management (business processes and integrated technology) in place for Web, inter-enterprise and intra-enterprise environments (0.8 probability). The tremendous increase in demand we are seeing for content management skills is in keeping with these projections.

The number and capabilities of packaged software and application platforms supporting efficient and effective content management is increasing.

There are a number of companies which now offer solutions to portions of the problem of content management and distribution. For example:

eBusiness Technologies™ (a Division of Inso™ Corp.) Now Advertises its "engenda" Product as Follows:

Leveraging ten years of experience in developing standards-based content management systems for the corporate marketplace, eBusiness Technologies' engenda is a turnkey, XML-enabled content management and workflow automation solution created to support ongoing Internet, intranet, and extranet requirements. Designed for rapid deployment and easy operation, engenda integrates with existing data communications infrastructures and e-business/eCommerce application servers. Intended for mid- to large-sized organizations, engenda is a flexible, collaborative solution for building and sustaining business-critical Web projects.

Vignette™ Corp Advertises its Vignette V/5 E-Business Platform as Follows:

The Vignette V/5 E-business Platform provides a proven, enterprise-ready architectural foundation that powers many of the largest and most successful e-business applications today. It is unique in providing a modular and reusable e-business applications framework that helps you respond and adapt quickly to changing market demands. It leverages your existing IT investment in open standards, component models, technical skills, and best practices. The V/5 E-business Platform provides a scalable, reliable, and high-performance foundation for delivering content, profiling, and managing interactions across multiple communication channels such as the Web, pagers, mobile phones, and e-mail.

Documentum™ Corp Advertises its Documentum 4I eBusiness System Which Includes its Dynamic Content Assembly Manager (DCA) as Follows:

DCA is the eBusiness tool offering intelligent content assembly and publishing to power your most valuable customer and partner connections. With it, you can gain a valuable advantage from accelerating the creation and delivery of reliable, personalized content that will reduce the costs and risks of eBusiness.

Documentum Dynamic Content Assembler (DCA) automates the routine, labor-intensive tasks of creating and publishing content. As the industry's premier content assembly and publishing solution, DCA lets you securely manage all your content and personalize it for delivery to the Web and, through the Documentum Open Content Architecture (OCA), to a printer, CD, fax, e-mail, cellular phone, or PDA device. This is a significant advance from first-generation content management systems, which do not offer the same level of personalization and publishing capabilities and require extensive programming for all but simple modifications.

DCA automates routine tasks such as dynamic assembly and delivery of trusted content. Through an advanced framework that makes use of software agents, DCA lets you quickly create and publish all kinds of valuable content, within and between companies, with fewer errors. This content can contain standard sections that can be reused in many ways, and tailored to the specific requirements of your customers and business partners.

DCA is based upon Documentum's Internet-scale content repository that manages all content as well as the related workflows and attributes for personalization. With DCA, content can be pulled directly out of the repository and dynamically assembled into Web pages tailored to the interests and preferences of specific customers and partners to guarantee high-impact and scalable Web publishing.

DCA delivers its unique capabilities through three main processes: load, build, and publish. The load agent provides methods for gathering information to be included as part of the content. The build agent selects the correct virtual content template and builds the new content based on these templates. The publish agent performs the final processing of the new documents. It merges sections together and includes the appropriate client information as part of the final content. The user, or a system application, submits a request. The load agent picks up this request and queues it to the build agent.

The build agent selects a Virtual Document Management template, which contains the rules for when each component should be copied into the new document. The build agent will create a new virtual document and link in the documents. Also associated with the template is a configuration object, which identifies where the documents will be stored in the repository. The build agent processes this structure and creates a new document. The build agent then passes the new document to the publish agent. The publish agent publishes the documents. It merges the sections, runs mail merge and optionally creates a PDF rendition. The final documents are now available for the end user to review.

Knowledge-based assembly—Using Documentum's rules-based Virtual Document Management capability, DCA delivers enterprise-wide, knowledge-based content assembly that enables content to be shared between many templates. Of equal importance, your staff can maintain and modify the content in a strict and auditable way without any programming, and apply compliance rules, style, and variable substitution on a global scale.

Cost and risk reduction—DCA dramatically reduces the costs of generating tailored content while maintaining editorial control over the content. The result is lower costs and risks.

Ease of use—Users can continue to use their existing desktop tools for content creation. Using a simple point-and-click interface, users can easily build templates that contain conditional sections.

Automated data access and process flow—Client information held in existing database systems can be automatically incorporated with the documents at publish time. In addition, DCA automates many of the approval processes needed to approve client communications.

Black Pearl™ Inc. Advertises its Knowledge Broker as Follows:

The Knowledge Broker is an e-markets intelligence platform that matches customer interests with seller expertise at the moment of contact, with full consideration of buyer and seller goals, preferences, behaviors, and market context.

Using intelligent agents distributed across an asynchronous, federated server architecture, the Black Pearl Knowledge Broker reads data as needed from existing enterprise databases and the internet, then converts the data into intelligent recommendations through the application of business rules. The rules are constructed using ordinary terms already used by the enterprise, and they can be changed on-the-fly by a business user keeping maintenance costs low and responsiveness high.

These products and related systems are but a few of a number of similar products now offered to businesses to address the general "Content Management and Delivery" problem. While these products address specific parts of the general problem and indeed can be used as third party tools/assets in a specific solution to the general problem, they do not address or solve several key areas of need for successful overall content management and delivery solutions. The present invention is a unique, automated approach to determining with business partners, more exactly, the needs of a business situation. The content management and delivery framework described more fully below, and the supporting methods aid in critical discussion and analysis of content management needs. The framework lays out related areas that should be involved in content management implementation efforts (e.g., content development, content assembly, knowledge management, campaign planing and implementation.) Whereas the products and providers described earlier assist with addressing certain content management needs, this method, framework, key considerations and processes address the up-front steps of assessing/determining specific needs and planning specific implementation approaches.

A number of companies have expressed a desire for such a coordinated, web-based content management and delivery system. For example, Accenture LLP™ (assignee of this invention) submitted a conceptual design of such a system in a confidential response to a confidential Request for Proposal (RFP) in November 1999. The RFP solicited bids for a Marketing Content Management, Output Production and E-Business project. The Accenture bid was not selected and the system proposed has since been discussed with potential clients on a confidential basis during the period from February through June 2000.

Most often when the term "content management" is used, it refers to the "storage and management of any type of data fragment, and the distribution of this content to one or more channels." (Channels being, for example, the WWW, voice, mobile devices.) The distribution of content must be personalized and consistent across all channels. In order to deliver content through these channels in a meaningful fashion, it must be done in accordance with a formal campaign. Campaigns may be literally marketing or publishing campaigns, or simply structured approaches to delivering content in a meaningful way. Therefore, campaign management and execution is an important component of an overall "content management" solution.

Throughout the process of managing content, knowledge and insights must be managed and applied as well. Knowledge management is the process of transforming ideas into business value. These ideas will drive the development of campaigns and content to be delivered through the channels. (Formalized knowledge may also be delivered through the content delivery process, as this knowledge is in the form of data files or fragments.)

There is a need in the art for a system for enabling assessment of needs, planning, analysis, and development of implementation approaches for bringing together processes and enabling technologies for campaign management, content management and delivery, and integrating knowledge management, whereby targeted content can be delivered to clients in order to acquire, retain, and grow profitable relationships with customers or businesses in the value chain. Proper planning, assessment, and implementation of solutions based on defined key processes and considerations will deliver such operational and planning efficiency. Such content management considerations and processes are applicable to the management and delivery of learning or educational material, marketing material, human resources information, formalized knowledge, product information, electronic learning and training, news and articles, to name just a few areas.

SUMMARY OF THE INVENTION

The present invention provides a solution to the needs described above through a system and method for assessment, planning and implementation of coordinated content management and delivery solutions, whereby coherent sales, training or marketing campaigns may be successfully executed, thereby driving operational efficiency and revenue, from supporting online customer management relationships.

A method is disclosed for designing a coordinated content management and delivery system, using key considerations related to the client environment, and using key processes, and applying these to the design problem with the assistance of a framework showing basic content management and delivery element relationships, whereby such a system can be implemented wherein coherent sales, training or marketing campaigns may be efficiently generated to web-based and other clients.

A method is disclosed for adding to the design solution a facility for creating and maintaining a customer profile through monitoring and capturing transactions to and from customers. The method further includes use of a formalized framework to guide assessment of needs in the planning and implementing of specific content management and delivery systems.

Additionally a system is disclosed for using a formalized framework plan to guide the hardware and software design of a content management and delivery system, based on computer logic mechanisms for aiding in developing key considerations and evaluating key processes used in determining an optimal design.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

BRIEF DESCRIPTION OF THE DRAWINGS

The features and advantages of the system and method of the present invention will be apparent from the following description in which:

FIG. 7 illustrates an exemplary data structure for an individual profile.

DETAILED DESCRIPTION OF THE INVENTION

The present invention provides a solution to the needs described above through a system and method for coordinated content management and delivery, whereby coherent sales, training or marketing campaigns may be efficiently generated to web-based and other clients.

The present invention is a unique, automated approach to determining with business partners, more exactly, the needs of a business situation. The content management and delivery framework described more fully below, and the supporting methods aid in critical discussion and analysis of content management needs. The framework lays out related areas that should be involved in content management implementation efforts (e.g., content development, content assembly, knowledge management, campaign planing and implementation.) Through joint discussions and analysis using this framework and associated processes and key considerations, a common understanding of needs, and best implementation approaches can be determined. The Framework and associated processes and key considerations describe in detail the role of knowledge management throughout the entire content management and delivery process. It also drives buy-in, agreement, and enables implementation planning; these implementations may then involve products such as those described previously.

Operating Environment

The environment in which the present invention is used encompasses the general Internet-based systems hardware and infrastructure along with well known electronic transmission protocols both conventional and wireless.

Figure 1:
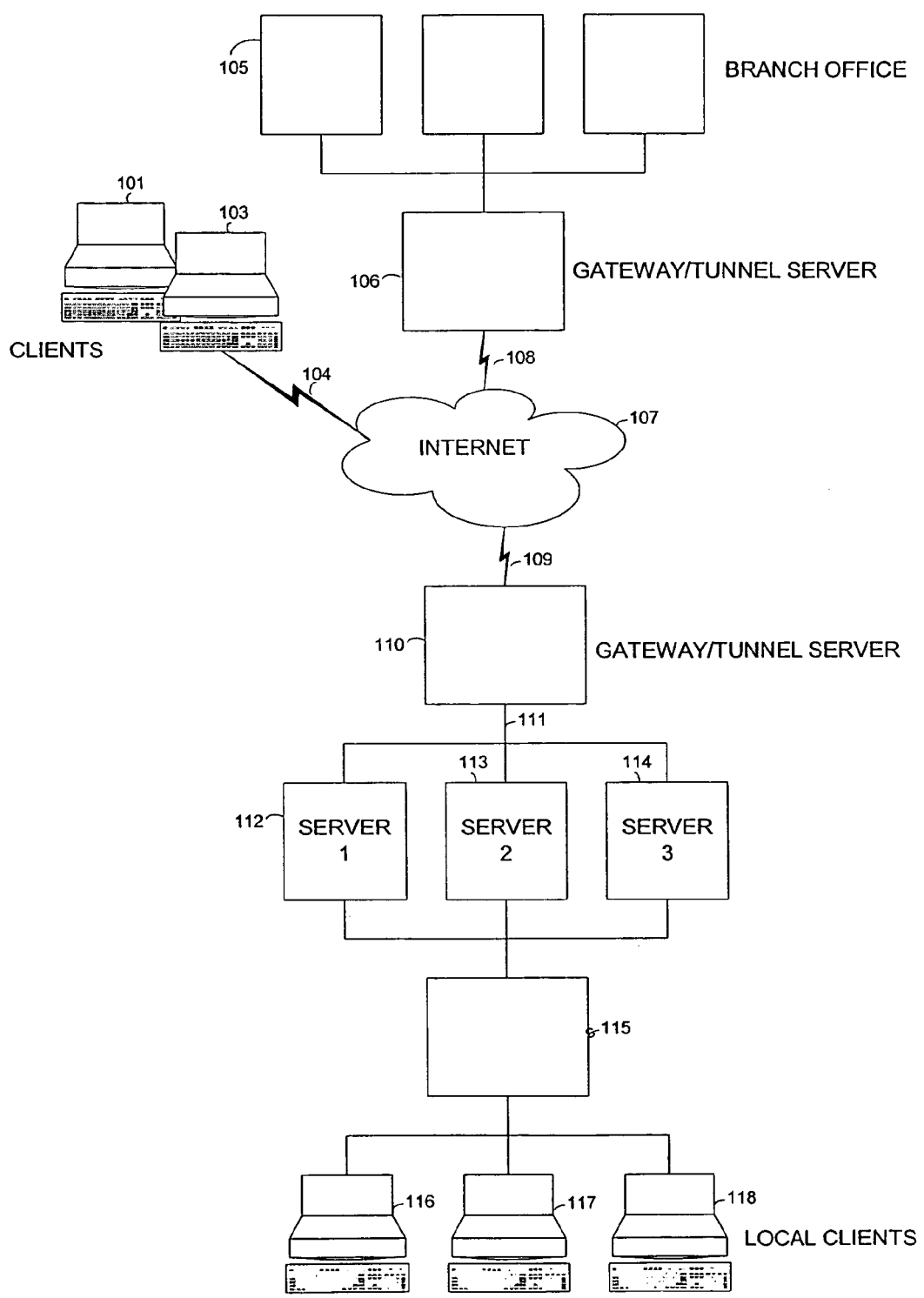
FIG. 1 illustrates an exemplary Internet distributed system configuration.

Some of the elements of a typical Internet network configuration 100 are shown in FIG. 1, wherein a number of client machines 105 possibly in a remote local office, are shown connected to a gateway/hub/tunnel-server/etc. 106 which is itself connected to the internet 107 via some internet service provider (ISP) connection 108. Also shown are other possible clients 101, 103 similarly connected to the internet 107 via an ISP connection 104, with these units communicating to possibly a central lab or office via an ISP connection 109 to a gateway/tunnel-server 110 which is connected 111 to various enterprise application servers 112, 113, 114 which could be connected through another hub/router 115 to various local clients 116, 117, 118. Any of these servers 112, 113, 114 could function as an development server for the analysis of potential content management and delivery design solutions as described in the present invention, as more fully described below.

Figure 2:
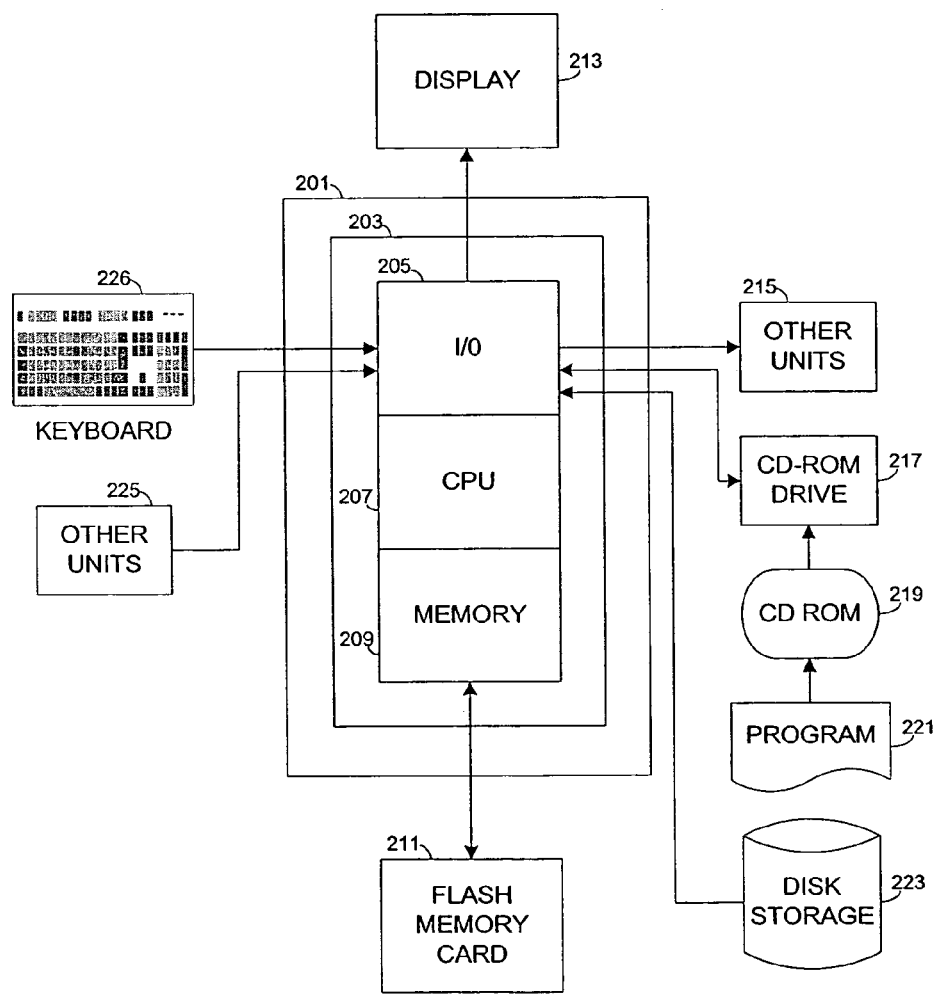
FIG. 2 illustrates a representative general purpose computer server configuration.

An embodiment of portions of the content management & delivery system of the present invention can operate on a general purpose computer unit 200 which typically includes generally the elements shown in FIG. 2. The general purpose system 201 includes a motherboard 203 having thereon an input/output ("I/O") section 205, one or more central processing units ("CPU") 207, a display 213, and a memory section 209 which may have a flash memory card 211 related to it. The I/O section 205 is connected to a keyboard 226, other similar general purpose computer units 225, 215, a disk storage unit 223 and a CD-ROM drive unit 217. The CD-ROM drive unit 217 can read a CD-ROM medium 219 which typically contains programs 221 and other data. Logic circuits or other components of these programmed computers will perform series of specifically identified operations dictated by computer programs as described more fully below.

Additional Background

The following describes the relationships between content management, document management, and digital asset management.

Content management—Content management involves the storage and processing of any type of data fragment. A data fragment might include a bit of text, or a document, presentation, image, audio file, video file, etc. In essence, any discrete electronic file can be stored and managed as a piece of content. (Templates, which provide for the layout, combination, and presentation of data fragments, are not contained in content repositories.) Most often when the term "content management" is used, it refers to the "storage and management of any type of data fragment, and the distribution of this content to one or more channels."

Document management—Document management often involves the storage and processing of specific types of content that are classified as documents. These are heavily text based, and may include images of documents as well as documents stored in native formats. Document management often involves more formal and rigid processes for check-in/checkout and versioning of documents. The term "document management" has been in use for a considerable period of time. The initial focus of document management was to have a single environment for the storage and deletion of critical documents within an organization. Products traditionally in this space are providing not only browser-accessible or browser-based versions, but are emphasizing that they can be used for the management of content of items other than documents. These messages are driven by the interest in providing documents and other content to a browser-based audience as part of publication and/or eBusiness initiatives.

Digital asset management—Digital asset management involves the storage and processing of rich content such as audio or video. Due the richness and size of these objects, more focus must be placed on the size and growth expectation for the repository. Digital asset management is quite similar to content management, as it involves multiple types of data fragments. The term "digital asset management" has been in use for some time, but does not necessarily imply the publication or distribution of these types of data fragments.

The present invention is focused upon this concept:

Knowledge-driven Content Management and Delivery Approach: a Framework for Assessment, Planning, and Implementation. The products that were described in the background section above, are for implementation or delivery of solutions. This framework/invention is to help determine what and how things should implement.

A formalized framework for supporting assessment of needs, and planning and implementing of content management solutions is described. This framework can and has been used in to guide discussions about desired capabilities. Through the use of this formalized framework and associated processes and considerations, the following questions related to specific client situations can be addressed:

Mention has been made of a need for content management—but how can we be sure we all mean the same thing when we talk about this?

An opportunity has been identified to add business value through content management—what is our point of view?

Are we considering all components of a complete content management environment when determining what is applicable for a given situation?

What business capabilities should be supported by a future environment?

What are the process considerations involved with the provision of these capabilities?

How will the critical process of knowledge management be integrated throughout the content management solution in order to drive a differentiated and high-value solution based on the unique collective insights and experiences of the organization?

What are the process and capabilities most applicable to the given situation which should drive enabling product analysis and selection?

This invention helps one figure out what they should be doing, rather than focusing on how to put in place what one has decided is needed. No one is helping to figure out or assess the needs in the content management area.

Figure 3:
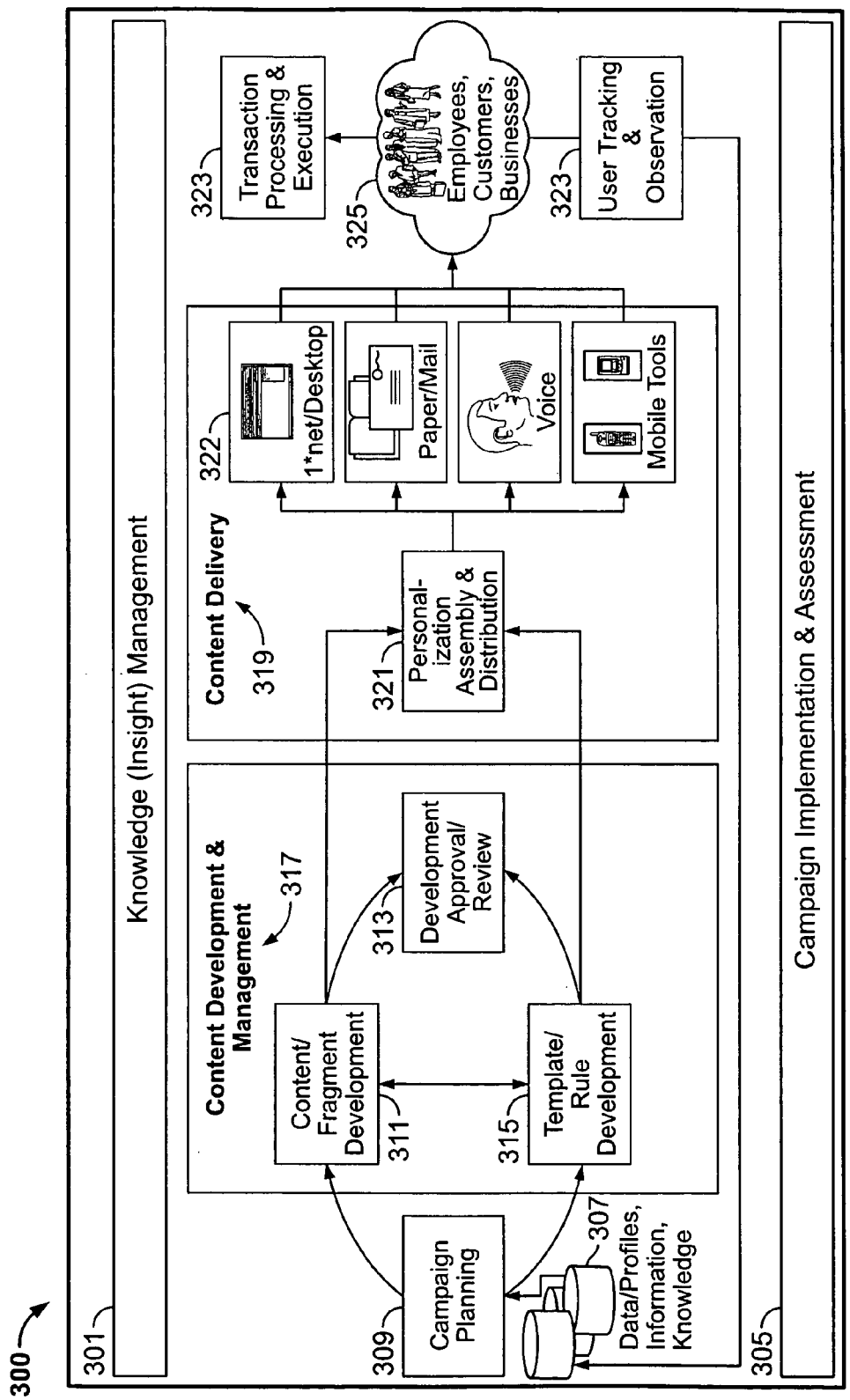
FIG. 3 illustrates a block diagram of a preferred embodiment of the content management and delivery system.

Referring now to FIG. 3, an exemplary formalized Content Management and Delivery Framework is depicted. This Framework 300 has been developed and refined over the course of several content management and knowledge management efforts. This Framework is a valuable piece for understanding the content management "landscape," identifying focus areas and desired capabilities, and developing and guiding implementation approaches.

In FIG. 3, the following features are described;

Campaign Planning 309 . . .

With data, information, and knowledge 307 about current and potential customers 325, targeted campaigns can be developed. These "campaigns" need not be marketing campaigns, but can be focused business campaigns to guide the efforts of the organization in a profitable direction. As with any new business action, a new campaign should be formulated based on the collective knowledge—insights, information, and experiences—of the organization. New business actions are currently made based on the knowledge at hand, but they must be made based on the formalized, collective knowledge and experiences of the organization 307 as a whole that have been captured and built upon over time. Through capture, sharing, synthesis, use of knowledge, the best approach based on the knowledge of the organization can be quickly determined. Aiding in this campaign planning process may be analytical tools 309 such as Valex™ or Black Pearl™, that work with data and provide recommended approaches; these engines are driven by the formalized knowledge-based rules of the business. Formalized knowledge-based rules, for example, may indicate that "potential clients of age X are most likely to purchase service Y" or that "potential clients with income of over A dollars are most likely to purchase products from group B".

Figure 4:
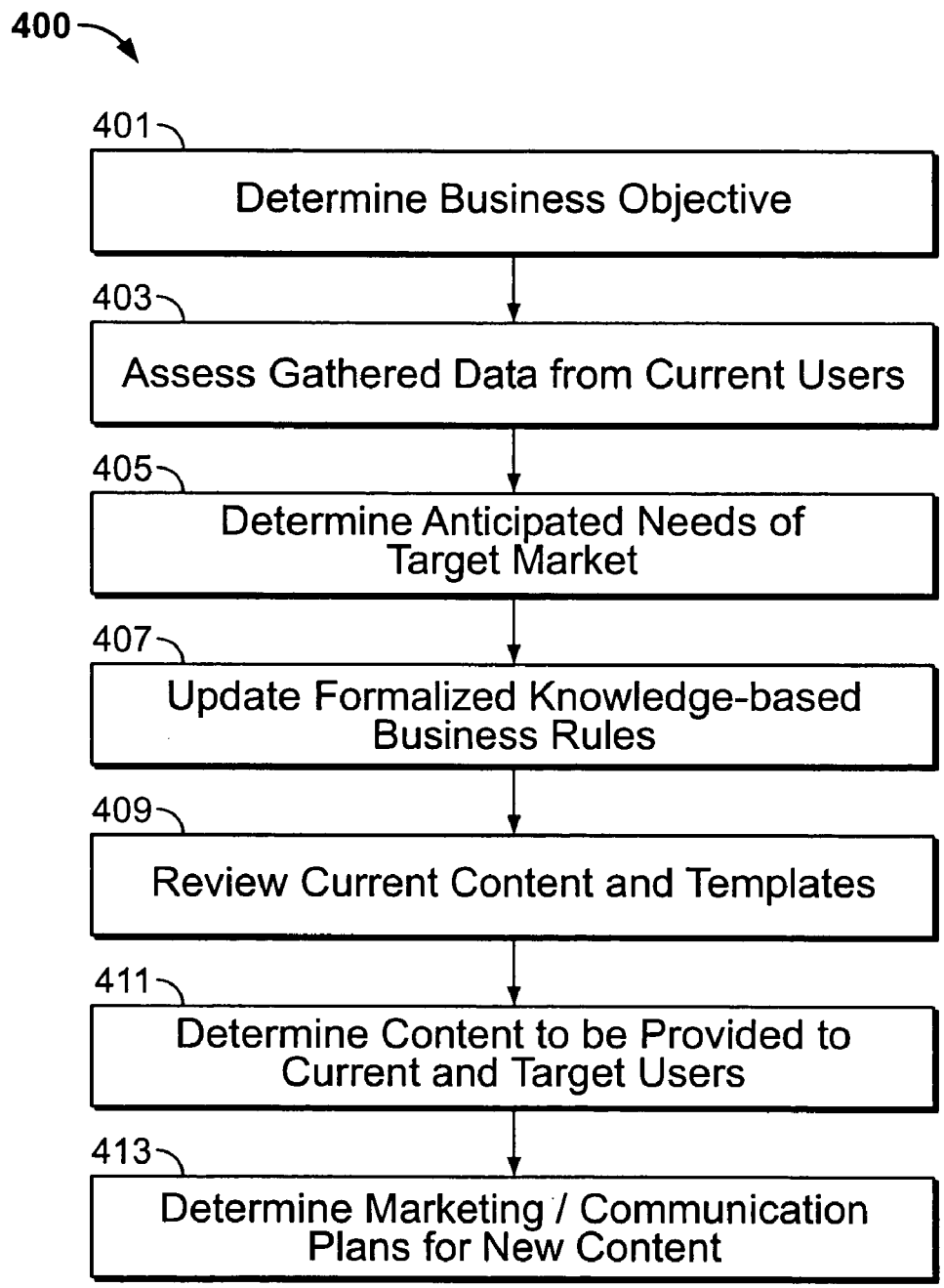
FIG. 4 illustrates a block diagram of an exemplary set of steps in preparing a campaign.

Referring now to FIG. 4 an exemplary set of steps in preparing a campaign 400 are described. Having first determined the business objectives of the campaign 401 data relative to these objectives are gathered from current users and assessed 403 as to their relevance and impact on the identified objectives, and as to the target market. The anticipated needs of the target market are determined 405 and existing formalized knowledge-based business rules (if any) are updated 407 or new rules created if necessary. Current multimedia content and templates are reviewed 409 and relevant content is selected to be provided to the target market users 411. Finally the marketing/communications plans for how this new content will be distributed to the target market are determined 413.

For a more detailed discussion of the content development and management functions we refer again to FIG. 3.

Content Development and Management 317 . . .

Figure 5:
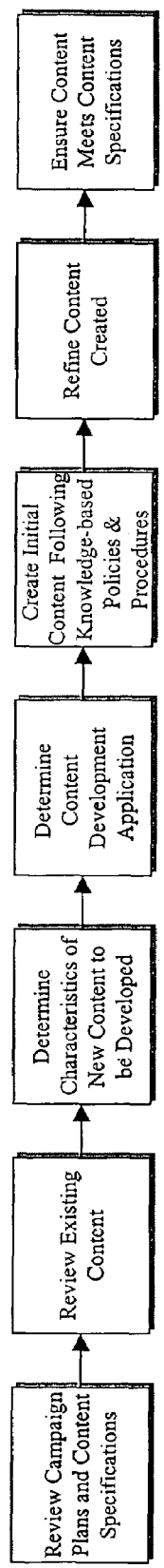
FIG. 5 illustrates a block diagram of an exemplary set of steps for content development.

Campaigns targeting clients and potential clients 325 will likely involve development of content—information, images, and knowledge—as well as delivery and transactions in the future. With a managed content environment, existing content fragments (e.g., text, images, multimedia) can be quickly identified, retrieved, and reviewed for applicability in a new campaign. This will eliminate the knowing or unknowing re-creation of fragments, saving considerable resources. An exemplary set of steps used in content development in the context of a campaign are shown in FIG. 5.

Figure 6:
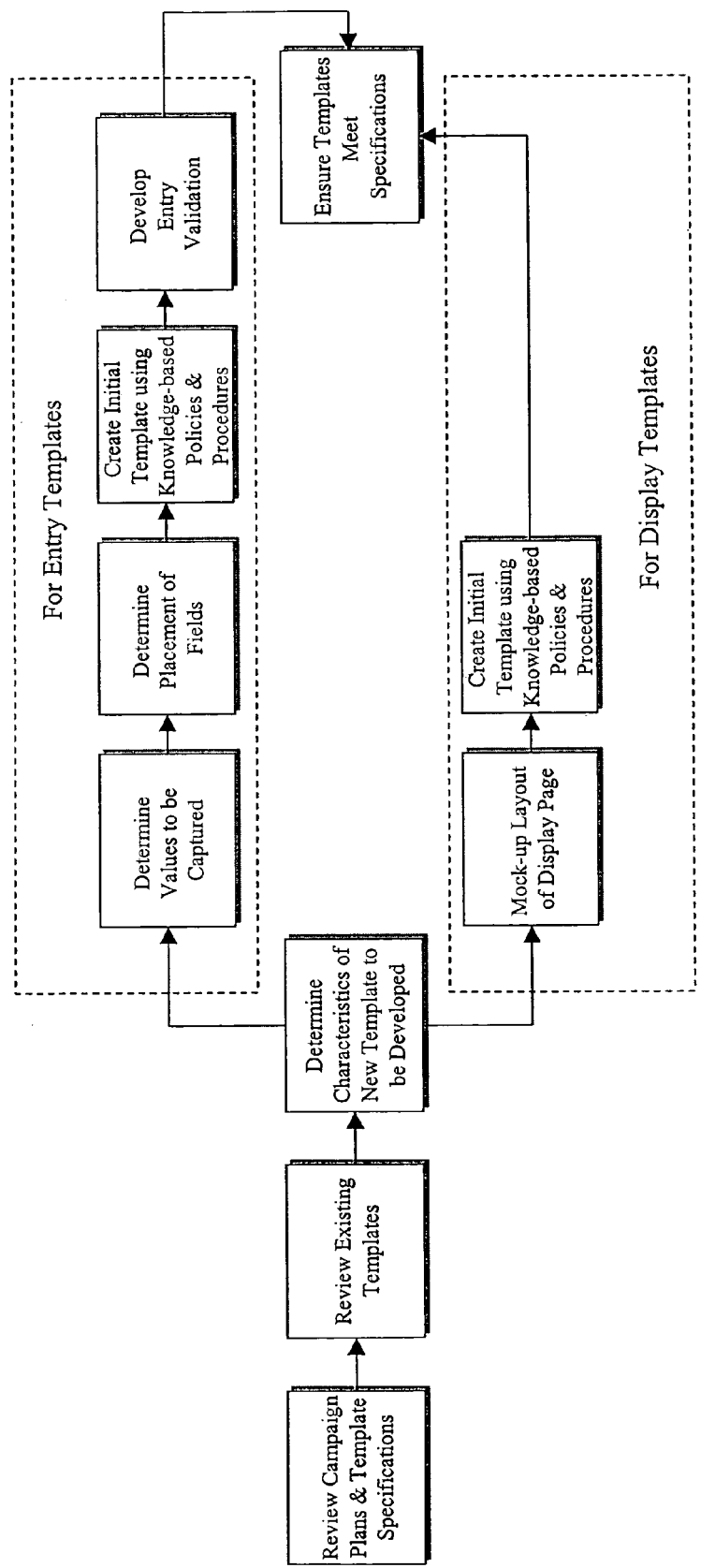
FIG. 6 illustrates a block diagram of an exemplary set of steps for how templates can be prepared.

Continuing with reference to FIG. 3, new fragments required must be approved for development, and efficiently and effectively developed 311 and reviewed 313. Templates that control layout of fragments and contain rules for bringing fragments together 315 must similarly be approved for development, developed, and reviewed. (This effort follows identification and review of existing templates to ensure that efforts are not being duplicated in this area either.) It is the templates 315 that provide for the formatting and presentation of data fragments. Two types of templates must be developed and managed: input and presentation templates. Input templates would capture, for example, the title, abstract, body, attachment, and topic of an article being entered into a content management system. A display template would then present article information entered in a defined fashion, meaning the template would dictate the placement, color and font of the title, the length of the abstract, etc. Both types of templates contain business rules; the entry templates include validation to ensure that text entered, for example, is of content length, and the display templates contain business rules that indicate information from which article entered should be shown. These business rules would essentially say, for example, use this template to show the article most recently entered that has a topic of 'Q' and status of 'Approved'. See FIG. 6 for a functional flow chart showing an exemplary set of steps for how templates are prepared within this context.

Continuing with reference to FIG. 3, throughout the process of developing and managing content 317, knowledge and best practices must be made use of and refined. Best practices, policies and procedures must be in place for the reuse and development of both content and templates. Policies and procedures must be documented, and available either on corporate electronic networks or in paper format, and referred to as content is being developed. Developers must look to the procedures and follow the steps included, and abide by the policies documented. Collaborative environments for discussing, working through, and refining procedures must be in place in order for continuous improvement. In order to effectively approve new items, guidelines—based on previous best practices, which are constantly refined—must be made available and utilized.

Content Delivery 319 . . .

With approved fragments 311 and templates 315 developed based on proven best practices, assembly for delivery 321 can take place. Content assembled 321 based on the rules within the templates must be both personalized and consistent across channels.

By "personalized," we mean that information and knowledge are rapidly and dynamically made available to customers based on their preferences. Preferences and information can be based not only on their requests or profiles 307, but also upon insights regarding intentions. Preferences chosen by users allow personalized content to be displayed. For example, information on certain types of investments, certain types of news, can be shown based on preferences, and just titles or titles and abstracts of articles can be shown, again based on user preferences. Insights regarding intentions can also be used to personalize content as well. For example, if a user is accessing articles and frequently asked questions posted about retirement planning, then offers for retirement products can be shown to the user when they next log on to the system. As customers interact within a channel, customized information needs to be pushed to them. This personalization should be based on demographics, characteristics, actions, intentions, and other knowledge, captured and contained in the data profiles 307 and should provide a unique service environment for this individual. Building on the example above, the fact that the individual is accessing articles and frequently asked questions posted would be stored in that individual's profile. When the user next logs on to the system, product information, for example, related to this intention of retirement, can be displayed for the user. This is possible as all content, when entered, is categorized as being related to a specific topic (recall the topic field as one that would be included on an entry template). In addition to providing unique value, personalization increases the barriers for changing to competing services. For example, customers making use of personalized services based on information they have entered will consider having to reenter information as a barrier to changing to a new service provider.

Knowledge must be effectively shared and leveraged in order to provide consistent interaction with customers across all channels. Customers expect, for example, call center representatives to be immediately knowledgeable of actions taken through telemarketing calls or web site activities. Additionally, it is the knowledge and the experiences—along with the speed and personalization of services—that will differentiate providers. In the preferred embodiment of the present invention this related knowledge is captured as a knowledge base. This knowledge is determine through analysis of the actions of the users, information captured on profiles, and the collective insights and experiences of those in the enterprise. This knowledge should be entered into best practice documents in the knowledge base in order to make new knowledge easily accessible by others in the enterprise, such as the call center representatives, for example.

Actions and Transactions 323 . . .

Data must be gathered from the actions and reactions of clients and potential clients from all channels involved. This includes data for transactions processing and execution 323—purchase of goods or service. It also includes information about the actions of the individuals or groups that are not financial transactions. For example, information should be captured about which types of pages or advertisements potential and current clients are accessing over the web, which direct mailings are responded to, and which discussions take place with customer service representatives. This data can be captured through analysis products such as DoubleClick™ and stored in a relational database, as well as through the web logging services that are part of standard web server software such as Microsoft IIS™. Analytical tools then run on these web logs or relational databases to provide recommendations, based on knowledge-based business rules. This data must be added to the data warehouse 307 and used to update profiles of individuals. It is through this process that knowledge-based analysis can take place and new, more effective campaigns can be planned.

THE PREFERRED EMBODIMENT

In the sections that follow, key considerations and more detailed process information are provided for use with portions of the Framework. While the specific solution approach for individual situations cannot be provided here, these considerations do provide insights into areas to be addressed to enable success of individual solutions. This additional detail builds upon the high-level process information included in the above sections.

Knowledge (Insight) Management 301

As described, knowledge management processes play a key role across the portions of the Content Management and Delivery Framework. Knowledge management is the systematic process of acquiring, creating, sharing, synthesizing, learning, and using information, insights, and experienced to achieve organizational goals. Knowledge management is the engine that transforms ideas into business value.

Organizational knowledge, at the fundamental level, is held in the minds of individuals. Knowledge at the individual level is composed primarily of "know-how," or insights from hands-on experience. This type of "insightful" knowledge is referred to as tacit knowledge, or working wisdom, and includes values, mental models, hunches, emotions, beliefs, etc.

Figure 8:
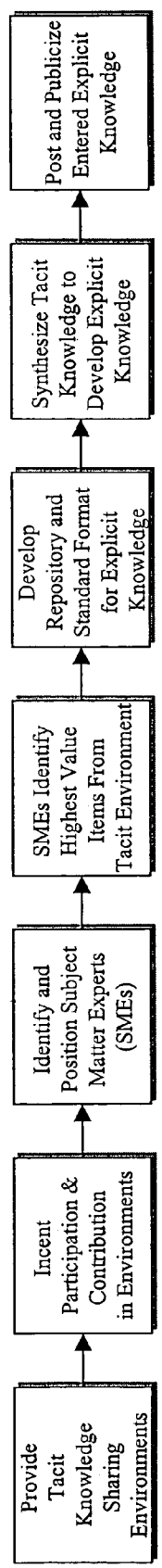
FIG. 8 illustrates a simple example of the process of conversion from tacit to explicit knowledge.

In order to share tacit knowledge—such as hunches and beliefs—it should be formalized somewhat, into explicit knowledge. Tacit knowledge becomes explicit knowledge when it is compiled into a slightly more formal or systematic structure such that it can be expressed. This conversion of the tacit knowledge into explicit knowledge that can be captured and inputted into a useful database is required before it can be usefully accessed. FIG. 8 indicates an exemplary set of steps for this process.

Again, it is this cycle that enables best practices for development and management to be refined and used, proven approaches for delivery to be used, and knowledge to be formalized for the support of campaign planning. It is also this cycle that enables knowledge to be formalized and delivered through systems designed using the Framework (see FIG. 3) described above as well.

Campaign planning hinges on the:

formalization of business rules, capture and analysis of user preferences, and the subsequent development and assessment of focused business initiatives or campaigns.

The formalization of business rules comes at least in large part through the formalization of knowledge and best practices of the organization. These formalized, knowledge-based business rules allow the appropriate action to be taken based on the business need and direction as well as on the data and information about current and potential clients. Examples of formalized business rules are given below.

The knowledge-based business rules must be applied to the user information and preferences in order to determine a direction for future content development and use of this content in specific marketing campaigns. That is, a direction that is best suited for the current customer audience; therefore, capture and analysis of the customer's user preferences is a critical piece of the ongoing process. As described previously, explicit actions and preference settings must be captured, as must be the implicit data, such as which sites an individual customer accesses. It is the mining of this data to gather meaningful information that will enable business rules to be appropriately developed and applied, and will direct subsequent development and assessment of the business campaigns aimed at these customer audiences.

Content Development and Management

Several process considerations must be addressed in conjunction with the development and management portion of the Framework. These processes must be addressed, regardless of the type of content being managed.

Access control and management—For all management environments, access and privileges must be managed and controlled. Before access and privileges can be granted from a technical standpoint, the access and privilege management process must be defined. The following questions must be addressed: Who is to have access? What are the privileges to be granted, and to which individuals? Who is to be able to create, read, update, delete, and approve content? What process needs to be in place to support versions and versioning? What is the process for adding new users and for granting privileges? These questions must be addressed, regardless of the specific type of content being managed.

Work flow—Related to access control is the process consideration of work flow. For each type of data fragment, content work flow and review processes must be defined. The work flow process must be defined before it can be enabled through a technical system. Sufficient privileges must be granted in order for reviewers—or perhaps additional developers—to have appropriate access and content that is "in progress." This content should only be readable by those involved in the review or final development process. During design and implementation of a work flow process, attention should be paid to mechanisms for logging/tracking the status of a fragment as it moves through the review process. This is particularly important if a single-threaded or serial work flow process (i.e., a reviewer must approve an item before it is passed along to the next reviewer) is implemented, as opposed to a multithreaded or parallel process (i.e., reviewers simultaneously and independently review content).

CRUD (create, read, update, and delete) process—Each of these processes must be defined and then enabled, regardless of the type of data fragment being stored or managed. This relates closely to the access and control process, as individuals must have the privilege to execute the processes for which they are responsible. Although a common repository may store the objects being managed, separate products will likely be used to create and update the object. For example, an image file may be stored in a repository, but would be create and accessed using a separate product, as opposed to the product supporting the repository (i.e., the image viewer).

Metadata capture—When a data fragment is stored, standard metadata must also be captured with it. This "data about data" is valuable in the processes of management, access, and use of fragments. Examples of metadata include author, date of creation, topic, and type. It is through this metadata that objects can be effectively classified and used.

Common Taxonomy—In order to further support consistent classification of objects and to enable effective search and retrieval, a common taxonomy is needed for certain types of metadata. A taxonomy defines the fields that will be filled in to categorize an object, and the keyword values—or choices—for each field. Existing taxonomies should be considered when fields such as topic and type, listed above, are decided upon for a given repository. A common set of choices for each area of the taxonomy should be developed. For each area of the taxonomy, a conscious decision should be made as to whether the field is required, whether multiple values will be accepted, and whether the values "All of the above" or "None/Not applicable" or "Other" should be provided. The process for management of the taxonomy areas and keyword values must also be defined including the approach to working through documents categorized as "Other." (The "Other" choice would be selected when the specific value the contributor wished to use was not provided, but, in the opinion of the contributor, should have been.).

In the preferred embodiment, these processes would preferably be discussed as a group. Current processes in these areas that have been documented and stored either in electronic format or on paper must be reviewed. It may be that these processes will dictate directly the processes to be integrated with the content management system. For example, the workflow steps for review of content may be fully developed on paper, and just need to be built into the content management system so that they are technology enabled, but essentially the same. It may be the case however, that group discussions and changes to the processes are required, or that the processes do not in fact exist. For example, there may not be common taxonomy and discussion and agreement on a new taxonomy structure will be needed before this structure can be integrated with the content management system. The point of including and addressing these processes is that these are the keys to an efficient end effective content management solution. Many products will allow taxonomies, for example, to be coded in, but do not provide the insight or guidance that this should be done, how it should be done, and how this should tie in with other key considerations and processes. The use of the Framework of FIG. 3 and the related understanding thereof provides the overall guidance to design and develop effective Content Management and Delivery solutions.

Content Delivery

A key consideration for the delivery of content is the combination of channels to be supported. Much of the focus of products has been on the delivery to the web channel, with increasing attention on delivery to hand-held/mobile devices. Additional complexity comes with the desire to deliver to additional channels as well—such as paper and call center environments.

Products and processes to support publishing of material and delivery of material to direct mail and other distribution channels are well known in the arts. These processes tend to be rather closed, end-to-end processes that have been used for some time and present challenging integration issues The processes as typically defined when using the Content Management and Delivery Framework for guidance, provide end-to end approaches to delivering content to different channels. The step of 'assemble and distribute content' provides for delivery to multiple channels, including, for example, direct mail. This can be done through translation of content to formats useable by direct mail or call center software, which may include translation to XML as an emerging standard. This provides a more consistent, integrated approach than those currently used, which handle direct mail delivery as a separate set of independent steps.

Similarly, call center environments are established environments well known in the art, that support inbound and outbound call lists and scripts. Again, the challenge comes with the desire to integrate content delivery mechanisms with call center environments to deliver consistent and personalized information across all of these channels. The 'Assemble and Distribute Content' step is described with the help of the Content Management and Delivery framework and involves bringing together content such that it can be distributed to call center environments, just as it can be distributed to direct mail environments. This can be done through translation of content to formats useable by direct mail or call center software, which may include translation to XML as an emerging standard.

As the channel needs are determined and addressed, one approach to actively consider is the use of a translation layer, or middleware to bring the content into a single format that can be handled by products corresponding to each channel. In an exemplary embodiment, XML (Extensible Markup Language), for example, has been positioned as the emerging standard to support transactions between systems, and could support a translation layer. Such a layer could be inserted into the framework solution before the delivery channels and provide information in a standard fashion that could more likely be used by products supporting specific channel delivery.

A Solution Example

Below are several examples of solutions that support the Content Management and Delivery System. These examples are provided to help increase the understanding of the system and method of the current invention, including the use of the framework described in FIG. 3 and the development and use of key considerations and specific processes inherent in any particular content management and delivery system. Mention of vendor and product names is meant to be representative, and where appropriate, particular vendors/products used in a current best mode will be indicated. Those skilled in the art will recognize that additional equivalent products are made available by vendors frequently.

Management and Delivery of Content for a Marketing Effort . . .

The following is a representative application of the content management and delivery invention, showing the combination of two actual, specific solution recommendations made to separate leading financial services clients—that includes information capture, campaign planning, and management and delivery of content in a personalized fashion.

The Content Management and Delivery Framework as shown in FIG. 3 was used to guide the project team in this example. The specific problem of the financial services client which the project team faced was the need to more effectively provide ongoing product and service marketing information to their current and potential clients in order to establish and maintain profitable customer relationships.

The content management and delivery framework was used to clearly lay out and build agreement around the approach to addressing this critical client need. The following text details the solution recommendation, or situation realized after implementing the processes and approaches described with this invention, that was provided to this specific client need. The following describes an additional example of the application of the current invention, in order to illustrate that those skilled in these arts can apply this invention to any number of similar circumstances.

Personalized marketing and other content and knowledge was designed to be provided consistently to customers and potential customers across multiple channels—the web, call centers or telephone interaction, and direct mail 322 in FIG. 3. Data was then captured about customers and customer interactions from these multiple channels 323. Two types of data from these channels were gathered. Data about overall usage—about questions asked, pages visited, time spent on pages or the telephone, etc., was added to a data warehouse 307. Data about actions of specific individuals was added to personal profiles in order to better understand current or potential customers in target markets. This data was also captured and added to the individual data profiles 307.

Captured data and information were analyzed to determine summary information, such as trends or most successful campaign efforts. Tools from Black Pear™ Inc., were used to analyze data that is stored in the SQL Server™ relational database. This analysis was done to produce information based on captured data stored in the profile of an individual. (for example see the exemplary data structure in FIG. 7). Knowledge-based business rules were developed and refined in order to best plan and act on newly gathered summary information. An exemplary business rule used in this financial client example was that customers who accessed articles classified as being for high-risk investors, and who accessed product information classified as being for high-net-worth investors should be pushed additional product and service information about investment options that are valuable to high-net-worth, risk-tolerant investors—characteristics that this client looks for in its target customers. In this example project, knowledge was shared and refined through discussion and collaboration using Microsoft Outlook/Exchange™. The financial client was advised that this knowledge should be applied as new campaigns are developed, and as new content and packaged knowledge is planned, developed, and reviewed. New content is to be developed using type-specific tools, and stored and managed using the content management tool they selected for their application—Vignette™, This content includes marketing messages, articles and news, product and service information, as well as educational information. Templates were developed using type-specific tools (e.g., Vignette™), and stored, managed, and brought together with content using these through tools Content was designed to be delivered to individuals based on their profiles. This completes the cycle through delivery of even more focused and personalized content. The key business driver and business outcome of this process the capture of leads in order to establish new and profitable service relationships, and/or the sale of goods. The result of applying the processes of the framework to the analysis of this financial client's business problem was the development of the system design, approach, and system components to permit their management of their content and automated used of it. It was demonstrated to the financial client, that it is through this cycle, including the lead and sales portions, that the desired high-value relationships with customers can be developed, maintained, and grown. It was additionally demonstrated, though development of the system components, that content could be managed and delivered to support high-value relationships, while also dramatically improving operational efficiency of the content management process.

The following describes an additional example of the application of the current invention, in order to illustrate that those skilled in these arts can apply this invention to any number of similar circumstances.

Management and Delivery of Content: an Enterprise Learning Effort Example.

The same content management and delivery functions as described above are applicable to learning management environments as well. The following is an example of the learning content management solution being developed for another large client:

The Client Problem

Learning information, in the form of packaged learning modules, is being provided to multiple audiences internally over the Web. The solution currently in place provides a great deal of functionality, but the operational effort involved is great as each page is managed independently, and many web developers are needed to support page maintenance and new page creation.

The vision is to have a managed learning environment that provides personalized learning content in an effectively managed, operated and personalized, fashion. Additionally, performance support capabilities are desired in order to provide knowledge and best practices to individuals as they perform their primary job functions.

The Solution

The Content Management and Delivery Framework illustrated in FIG. 3 and described above, was used as a guide to the assessment of the problem and aid in developing an understanding of an efficient solution having the desired capabilities. Through an analysis of the actions and performance of the professionals at the client, learning or performance improvement needs were identified. The framework shows how this step and such product-enabled processes are part of an overall solution, and illustrates that actions of users must be captured, analyzed, and improvement actions or campaign plans developed based on the actions and content needs of the users. Current learning modules were identified and the process flow for content development was designed to include the step of reviewing existing content, so that content is not re-developed. The content management system enables this by providing a database driven environment for the storing and accessing of existing content, and new learning content rapidly designed and developed. These modules were designed to be delivered in a personalized and integrated fashion to individuals as they are learning, and also to be pushed in useful fashion to individuals as they are performing their job. Subsequent re-analysis of performance, along with noting the operational efficiencies provided by the formal content management and delivery solution for learning, will provide justification for the effort, as well as information on how to further increase the performance of the individuals.

Management and Delivery of Content: a Start-Up Effort in an Internet Launch Center . . .

Application of the Framework and solutions based upon it need not be just system designs for large clients with enterprise level needs. The following is a representative example of how the Framework was used in conjunction with an effort in an Accenture Internet Launch Center™.

The Problem

A new venture organization needs to mange and deliver content to repair personnel in the field. This is needed in order to assess the problem with equipment, and provide technicians information and knowledge—from other technicians and from the product manufacturers—needed to repair the equipment. Initially, it was only known that this was an imperative and there were many sources of content currently available. The Framework of this invention was used to provide and understand a proven approach to managing and delivering content to channels.

Use of the framework and related processes provided a point of view that helped shape messages delivered by an Accenture team in the successful sales presentation. It Framework guided the common understanding of focus areas for the assessment project underway, including the processes involved in managing content, the channels to be supported, and will guide the mapping of products and application development solutions based to the needed capabilities represented with the Framework. The project team used the Content Management and Delivery Framework in order to understand all of the components and how they related. They obtained a better understanding of points of view of content management experts, and integrated these points of view into sales messages. They used their understanding of the client situation (e.g., sources of content, channels to be delivered to) in conjunction with the Framework, key considerations, and processes as described above, to develop sales messages for the client.

These and other similar content management and delivery problems can easily be addressed using the framework, key considerations and processes described above.

Those skilled in these arts will recognize that the physical implementation of the resultant solution design may use various hardware and software combinations, such as database systems by Oracle™, Informix™, IBM™, etc., with client and server computers supplied by any number of companies such as IBM, Sun Microsystems, Apple, HP, etc., and can use various appropriate software tools for portions of the content management and delivery activities, for portions of the content delivery activities and for portions of the transaction processing, monitoring and execution. Some of the currently available tools include those supplied by:

Allaire/Spectra/HomeSite
ATG/Dynamo
Blue Martini/Content Management Module
Broadvision/One-to-One
Calico
Documentum/Rightsite
eMeta/eRights
ePrise/Participant Server
FileNet
FutureTense/Internet Publishing System
Informix/i.Reach
Inso/Dynabase
Interleaf/BladeRunner, QuickSilver and others
Interwoven/Teamsite
InfoDesk
iPlanet (Netscape/Sun Alliance)/Publishing Xpert
Macromedia/Various Products
MediaSurface
Microsoft/Site Server
nCompass
Open Market/Internet Publishing System
Reciprocal/Digital Clearing Service
Verano/Iluminar
Vignette/StoryServer, Syndication Service.

Note that these names of companies and products are trademarks of the relevant companies.

Having described the invention in terms of a preferred embodiment, it will be recognized by those skilled in the art that various types of general purpose computer hardware may be substituted for the configuration described above to achieve an equivalent result. Similarly, it will be appreciated that arithmetic logic circuits are configured to perform each required means in the claims for performing the various features of message recognition, message creation, message storage and connection to a mobile telephony system. It will be apparent to those skilled in the art that modifications and variations of the preferred embodiment are possible, such as different mobile telephony systems may be used, different communications media such as wireless communications, as well as different types of PCDs may be used by addressees and or senders of various types of electronic messages, all of which fall within the true spirit and scope of the invention as measured by the following claims.

I claim:

1. A method for designing a coordinated content management and delivery system comprising the acts of:
    obtaining information indicative of a client environment;
    determining by computer key considerations related to the client environment, the key considerations comprising: what combinations of channels and related devices are to be supported and what content related processes are needed to support publishing;
    providing by computer key processes for use in developing a solution to a system design problem, the system design problem being the determination of what content management and delivery products and processes to implement, and how to implement them, wherein the key processes comprise:
        workflow tracking for content elements, wherein the workflow tracking for content elements includes tracking for review status and access privileges,
        capture and use of at least one customer's user preferences, wherein the at least one customer's user preferences include an access record associated with user preferences,
        application of business rules to user preferences to determine future content development, wherein the application of business rules to user preferences includes input templates for input characteristics of content elements and display templates for display characteristics of content elements,
        access control for the content management system, wherein the access control of content management includes access control for creating, reading, updating, deleting, and approving content elements, and
        metadata capture including author, date of creation and topic, wherein the metadata capture includes a taxonomy having one or more fields for categorizing content elements and corresponding keyword values for the one or more fields;
    applying computer these key considerations and processes to the system design problem with the assistance of a framework showing basic content management and delivery element relationships to provide personalized content for a customer, wherein the framework includes a content delivery system and a content development and management system connected to the content delivery system, whereby such a solution to the system design problem is produced, and wherein the personalized content is in accordance with the at least one customer's user preferences and at least one business objective;
    receiving planning input at the a content development and management system from a planning unit;
    processing the planning input at the content development and management system to determine planning output and content elements;
    receiving planning output at the planning unit from the content development and management system;
    receiving content elements at the content delivery system from the content development and management system;
    assembling content elements at the content delivery system to determine customer output;
    receiving customer output at the customer unit from the content delivery system; and
    delivering the personalized content to the customer, further comprising:
        selecting a delivery channel from a plurality of delivery channels in accordance with the at least one customer's user preferences; and
        distributing the personalized content over the selected delivery channel.

2. The method of claim 1 wherein the solution to the system design problem includes facilities whereby coherent sales, training, electronic learning or marketing campaigns are efficiently generated to web-based and other clients.

3. The method of claim 2 wherein the solution to the system design problem includes facilities whereby transaction processing and execution are monitored and captured for adding data to a target customer's profile.

4. The method of claim 1 wherein the frame work is a formalized framework for supporting assessment of needs, and planning and implementing of content management solutions.

5. The method of claim 4 wherein the formalized framework is used to guide discussions about desired capabilities of the desired content management and delivery system.

6. The method of claim 5 wherein through the use of this formalized framework and associated processes and considerations, a meaning of content management is developed and a set of process considerations required for this definition of content management is provided.

7. The method of claim 5 wherein through the use of this formalized framework and associated processes and considerations, an assessment of business capabilities to be supported is made.

8. The method of claim 7 wherein through the use of this formalized framework and associated processes and considerations, an effective design solution is achieved including an assessment of available products and services.

9. A system for use in designing a coordinated content management and delivery system comprising:
   an associated logic mechanism for obtaining information indicative of a client environment;
   a first logic mechanism for determining key considerations related to the client environment, the key considerations comprising: what combination of channels and related devices are to be supported and what content related processes are needed to support publishing;
   a second logic mechanism for determining key processes for use in developing a solution to a system design problem, the system design problem being the determination of what content management and delivery products and processes to implement, and how to implement them, wherein the key processes comprise:
      workflow tracking for content elements, wherein the workflow tracking for content elements includes tracking for review status and access privileges,
      capture and use of at least one customer's user preferences, wherein the at least one customer's user preferences include an access record associated with user preferences,
      application of business rules to user preferences to determine future content development, wherein the application of business rules to user preferences includes input templates for input characteristics of content elements and display templates for display characteristics of content elements,
      access control for the content management system, wherein the access control of content management includes access control for creating, reading, updating, deleting, and approving content elements, and
      metadata capture including author, date of creation and topic, wherein the metadata capture includes a taxonomy having one or more fields for categorizing content elements and corresponding keyword values for the one or more fields; and
   applying these key considerations and processes to the system design problem with the assistance of a framework showing basic content management and delivery element relationships to provide personalized content for a customer, wherein the framework includes a content delivery system and a content development and management system connected to the content delivery system, whereby such a solution to the system design problem is produced, and wherein the personalized content is in accordance with the at least one customer's user preferences and at least one business objective;
   a third logic mechanism that delivers the personalized content to the customer by selecting a delivery channel from a plurality of delivery channels in accordance with the at least one customer's user preferences and by distributing the personalized content over the selected delivery channel;
   a fourth logic mechanism that receives planning input at the a content development and management system from a planning unit and processes the planning input at the content development and management system to determine planning output and content elements;
   a fifth logic mechanism that receives the planning output at the planning unit from the content development and management system;
   a sixth logic mechanism that receives content elements at the content delivery system from the content development and management system and assembles the content elements at the content delivery system to determine customer output; and
   a seventh logic mechanism that receives the customer output at the customer unit from the content delivery system.

10. The system of claim 9 wherein the solution to the system design problem includes computer based facilities whereby coherent sales, training, electronic learning or marketing campaigns are efficiently generated to web-based and other clients.

11. The method of claim 10 wherein the solution to the system design problem includes computer based facilities whereby transaction processing and execution are monitored and captured for adding data to a target customer's profile.

12. The system of claim 9 wherein the framework is a formalized framework for supporting assessment of needs, and planning and implementing of content management solutions.

13. The system of claim 12 wherein the formalized framework is used to guide discussions about desired capabilities of the desired content management and delivery system.

14. The system of claim 13 wherein through the use of this formalized framework and associated processes and considerations, a meaning of content management is developed and a set of process considerations require for this definition of content management is provided.

15. The system of claim 13 wherein through the use of this formalized framework and associated processes and considerations, an assessment of business capabilities to be supported is made.

16. The system of claim 15 wherein through the use of this formalized framework and associated processes and considerations, an effective design solution is achieved including an assessment of available hardware and software products and services.

17. Computer-readable media tangibly embodying a computer program for designing a coordinated content management and delivery system, the computer program comprising executable instructions for:

obtaining information indicative of a client environment;

determining key considerations related to the client environment, the key considerations comprising: what combination of channels and related devices are to be supported and what content related processes are needed to support publishing;

providing key processes for use in developing a solution to a system design problem, the system design problem being the determination of what content management and delivery products and processes to implement, and how to implement them, wherein the key processes comprise:

workflow tracking for content elements, wherein the at least one customer's user preferences include an access record associated with user preferences, capture and use of at least one customer's user preferences, wherein the at least one customer's user preferences include an access record associated with user preferences, application of business rules to user preferences to determine future content development, wherein the application of business rules to user preferences includes input templates for input characteristics of content elements and display templates for display characteristics of content elements, access control for the content management system, wherein the access control of content management includes access control for creating, reading, updating, deleting, and approving content elements, and metadata capture including author, date of creation and topic, wherein the metadata capture includes a taxonomy having one or more fields for categorizing content elements and corresponding keyword values for the one or more fields;

applying these key considerations and processes to the system design problem with the assistance of a framework showing basic content management and delivery element relationships to provide personalized content for a customer, wherein the framework includes a content delivery system and a content development and management system connected to the content delivery system, wherein such a solution to the system design problem is produced, and wherein the personalized content is in accordance with the at least one customer's user preferences and at least one business objective;

receiving planning input at the a content development and management system from a planning unit;

processing the planning input at the content development and management system to determine planning output and content elements;

receiving planning output at the planning unit from the content development and management system;

receiving content elements at the content delivery system from the content development and management system;

assembling content elements at the content delivery system to determine customer output;

receiving customer output at the customer unit from the content delivery system;

delivering the personalized content to the customer, further comprising:

selecting a delivery channel from a plurality of delivery channels in accordance with the at least one customer's user preferences; and distributing the personalized content over the selected delivery channel.

\* \* \* \* \*